(12) United States Patent
Sieradzki et al.

(10) Patent No.: US 11,426,922 B2
(45) Date of Patent: Aug. 30, 2022

(54) METHOD OF BLOW MOLDING

(71) Applicant: DISCMA AG, Hünenberg (CH)

(72) Inventors: Richard Sieradzki, Frankfort, IL (US);
G. David Lisch, Jr., Jackson, MI (US);
Gregory Carpenter, Ann Arbor, MI (US)

(73) Assignee: DISCMA AG, Hünenberg (CH)

( * ) Notice: Subject to any disclaimer, the term of this patent is extended or adjusted under 35 U.S.C. 154(b) by 68 days.

(21) Appl. No.: 16/620,222

(22) PCT Filed: Jun. 29, 2018

(86) PCT No.: PCT/IB2018/000835
§ 371 (c)(1),
(2) Date: Dec. 6, 2019

(87) PCT Pub. No.: WO2019/002944
PCT Pub. Date: Jan. 3, 2019

(65) Prior Publication Data
US 2020/0198216 A1    Jun. 25, 2020

Related U.S. Application Data (60) Provisional application No. 62/527,420, filed on Jun. 30, 2017.

(51) Int. Cl.
*B29C 49/46* (2006.01)
*B29C 49/78* (2006.01)
(Continued)

(52) U.S. Cl.
CPC ............ *B29C 49/783* (2013.01); *B29C 49/46* (2013.01); *B29C 49/78* (2013.01);
(Continued)

(58) Field of Classification Search
CPC .................. B29C 49/783; B29C 49/46; B29C 2049/4664; B29C 2949/78537;
(Continued)

(56) References Cited

U.S. PATENT DOCUMENTS

| | | | |
|---|---|---|---|
| 8,573,964 B2 | 11/2013 | Andison et al. | |
| 2013/0106027 A1* | 5/2013 | Maki | B29C 49/786 264/524 |
| 2017/0291345 A1* | 10/2017 | Toyoda | B29C 49/10 |

FOREIGN PATENT DOCUMENTS

| | | | |
|---|---|---|---|
| CN | 102837418 A | 12/2012 | |
| CN | 104023941 A | 9/2014 | |

(Continued)

*Primary Examiner* — Jeffrey M Wollschlager
*Assistant Examiner* — Shibin Liang
(74) *Attorney, Agent, or Firm* — Michael E. Dockins; Shumaker, Loop & Kendrick, LLP (57) ABSTRACT

Systems and methods for simultaneously forming and filling a container are provided where a pressure source is accelerated from an initial state to attain a predefined process speed while applying pressure to a volume of fluid. The volume of fluid is fluidly coupled to a preform upon attaining the predefined process speed, the pressure source directs at least a portion of the volume of fluid into the preform and stretching the preform to form the container, where the container includes at least the portion of the volume of fluid. The volume of fluid is fluidly decoupled from the container and the pressure source is then decelerated from the predefined process speed toward the initial state.

20 Claims, 8 Drawing Sheets

(51) Int. Cl.
*B29K 67/00* (2006.01)
*B29L 31/00* (2006.01)

(52) U.S. Cl.
CPC ............... *B29C 2049/4664* (2013.01); *B29K 2067/003* (2013.01); *B29L 2031/7158* (2013.01)

(58) Field of Classification Search
CPC ... B29C 49/16; B29C 49/10; B29K 2067/003; B29L 2031/7158; B29D 22/00
See application file for complete search history.

(56) References Cited

FOREIGN PATENT DOCUMENTS

| | | | | |
|---|---|---|---|---|
| CN | 106103044 A | 11/2016 | | |
| EP | 3205474 A1 | 8/2017 | | |
| WO | 2013063453 A1 | 5/2013 | | |
| WO | 2014209339 A | 12/2014 | | |
| WO | WO2016047067 | * | 3/2016 | ............. B29C 49/10 |

* cited by examiner

METHOD OF BLOW MOLDING

CROSS-REFERENCE TO RELATED APPLICATIONS

This application claims the benefit of U.S. Provisional Application No. 62/527,420, filed on Jun. 30, 2017. The entire disclosure of the above application is incorporated herein by reference.

FIELD

This disclosure relates to ways to form and fill containers, and particularly to systems and processes that allow for simultaneously forming and filling plastic containers.

INTRODUCTION

This section provides background information related to the present disclosure which is not necessarily prior art.

As a result of environmental and other concerns, various plastic containers, including polyolefin and polyester containers, are used to package numerous commodities previously supplied in glass and other types of containers. Manufacturers and fillers, as well as consumers, have recognized that plastic containers are lightweight, inexpensive, recyclable, and manufacturable in large quantities. Blow-molded plastic containers have accordingly become commonplace in packaging numerous commodities. Examples of plastic materials used in forming blow molded containers include various polyolefins and polyesters, such as polypropylene (PP), polyethylene (PE), high density polyethylene (HDPE), and polyethylene terephthalate (PET).

Traditionally, blow molding of containers and subsequent filling of containers developed as two independent processes often performed by different entities. In order to make bottle filling more cost effective, some fillers have moved blow molding in-house, in certain cases blow molding equipment is directly integrated into container filling lines. Equipment manufacturers have recognized advantages associated therewith and are providing "integrated" systems that are designed to insure that blow molding equipment and filling equipment are fully synchronized. Despite the efforts in bringing the two processes closer together, blow molding and filling continue to be two independent, distinct processes. As a result, significant costs in terms of time and equipment expenditure may be incurred while separately configuring and performing these two processes.

One process for simultaneously forming and filling a container is described in U.S. Pat. No. 8,573,964, hereby incorporated herein in its entirety by reference. During the process disclosed in the '964 patent, a preform (e.g., a PET preform) is heated prior to entering the blow molding system. The preform exits an oven at about 140° C. During the molding process, the temperature of the preform desirably stays between about 140° C. and about 63° C. (the phase change/solidification temperature of PET) ensuring the resultant container has the desired aesthetic and functional properties. Accordingly, containers must be formed at or above the phase change/solidification temperature of the material used to form the container. The heated preform, at its maximum temperature, has a known (or knowable) amount of heat energy available to be distributed during formation of the container during the blow molding operation.

During the blow molding operation, this heat energy is lost to the mold surrounding the preform, lost to the fluid used to expand the heated preform into the container, and the heat energy is also distributed along the larger surface area of the container formed from the stretched and blown preform. Because a portion of the heat energy of the preform is provided in the neck finish, and is thus unavailable for loss or distribution during the blow molding process due to neck finishes not being contacted by the fluid used for the blow molding operation nor disfigured or otherwise affected by the blow molding operation, a smaller portion of the total heat energy is available for distribution to the fill fluid, mold, etc. Accordingly, undesirable heat losses may cause concerns with consistent forming and filling of containers. It would be desirable to develop ways to form containers that maintain thermal properties of a heated preform during an expansion and filling thereof.

SUMMARY

The present technology includes systems and processes that relate to blow molding using coincident forming and filling operations, where a rate of container formation is maximized and heat lost from a container preform is minimized.

A container can be formed and filled by accelerating a pressure source from an initial state to attain a predefined process speed while applying pressure to a volume of fluid. The volume of fluid is fluidly coupled to a preform upon attaining the predefined process speed, where the pressure source directs at least a portion of the volume of fluid into the preform and stretches the preform to form the container. The resulting container thereby includes at least the portion of the volume of fluid. The volume of fluid is then fluidly decoupled from the container. The pressure source is decelerated from the predefined process speed toward the initial state once the volume of fluid is fluidly decoupled from the container. At least a portion of the preform can be disposed in a mold and the pressure source can direct at least the portion of the volume of fluid into the preform and stretch the preform to conform to the mold to form the container. A stretch rod can also be used to mechanically stretch the preform. The volume of fluid can include a liquid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the object in use or operation in addition to the orientation depicted in the figures. For example, if the object in the figures is turned over, elements described as "below" or "beneath" other elements or features would then be oriented "above" the other elements or features. Thus, the example term "below" can encompass both an orientation of above and below. The object may be otherwise oriented (rotated 90 degrees or at other orientations) and the spatially relative descriptors used herein interpreted accordingly.

The present technology relates to various methods and systems that permit the forming and filling of a preform at a rate previously not attainable by conventional methods and systems. In particular, methods of simultaneously forming and filling a container and systems configured for performing such methods include acceleration of a pressure source from an initial state to attain a predefined process speed while applying pressure to a volume of fluid. The volume of fluid is fluidly coupled to a preform upon attaining the predefined process speed, where the pressure source directs at least a portion of the volume of fluid into the preform and stretches the preform to form the container. The container resulting therefrom includes at least the portion of the volume of fluid. The volume of fluid is fluidly decoupled from the container, whereafter the pressure source is decelerated from the predefined process speed toward the initial state.

Based upon the present methods and systems, the pressure source is allowed to accelerate to the predefined process speed prior to fluidly coupling the preform to the volume of fluid, where the volume of fluid is then fluidly decoupled from the container prior to deceleration of the pressure source. This provides an improvement in fill time, where certain embodiments can reduce the fill time by almost 40%. In certain embodiments, a fill channel to the prefrom can be vented at a point where motion of the pressure source ceases (e.g., forward travel of a servo pressure system is at a maximum), then the fill circuit can be exhausted. The improved sequencing of the fluid coupling and decoupling improves the filling and forming time for blow molding a preform, provides an increase in the rate at which preforms can be processed, does not introduce any process instability, and can make it unnecessary to increase power to the pressure source in order to increase filling and forming speed.

The pressure source can include various structural and functional aspects. The pressure source can have a velocity of about zero at the initial state. That is, the pressure source can start from a resting state, where substantially no pressure is applied to the volume of fluid. The pressure source can directs at least the portion of the volume of fluid into the preform at a substantially constant process speed until the volume of fluid is fluidly decoupled from the container. This constant process speed can allow for a predetermined stretching rate for a given container and for a predetermined fill volume. In some instances, the substantially constant process speed can be tailored for a particular container having a particular volume and even for a particular mold type or shape. The pressure source, and the predefined process speed thereof, can form and fill the preform in to the container in certain defined time periods. These include where the pressure source directs at least the portion of the volume of fluid into the preform and stretches the preform to form the container in less than about 0.5 seconds, in about 0.03 seconds to about 0.15 seconds, and in less than about 0.1 seconds. Various types of pressure sources can be used with the present technology, including a servo pressure system, a piston-like device (actuated by one of pneumatic, mechanical, and hydraulic pressure), and a hydraulic pump. Other pressure sources can be used; however, acceleration time of the pressure source can be important to the forming and filling time for a given container and hence rapidly accelerating pressure sources such as a servo pressure system can be particularly useful in certain embodiments.

The preform can include the various following aspects. A least a portion of the preform can be disposed in a mold and the pressure source can direct at least the portion of the volume of fluid into the preform and stretch the preform to conform to the mold. In this way, the container including at least the portion of the volume of fluid is formed and filled. The preform can be at or above a phase change/solidification temperature of a material from which the preform is formed. For example, the preform can be heated or preheated to about the melting point of the material from which the preform is made. As known in the art, various plastics and polymer types, including blends thereof, can be used in blow molding. However, one preferred plastic that can be used in conjunction with the present technology is polyethylene terephthalate. The can be heated or preheated to a temperature between about 190° F. and about 250° F. The preform can also be mechanically stretched with a stretch rod. For example, the heated or preheated preform can be mechanically stretched in an axial direction using the stretch rod, where the pressure source directing at least a portion of the volume of fluid into the preform causes stretching of the preform in a radial direction. The pressure source can also contribute to axial stretching of the preform in certain embodiments.

The volume of fluid used to form and fill the container can include various fluids, amounts of fluids, and fluids derived from various process streams. Examples include where the volume of fluid includes a liquid, where the volume of fluid includes a gaseous fluid portion and a liquid fluid portion, or where the volume of fluid is substantially all liquid. The fluid can be subject to temperature control and can be the output from various pasteurization or sterilization operations, including various filtration, mixing, and/or gassing or degassing operations. Types of fluids include various liquid solutions, suspensions, and emulsions of various food and drink products, cleaners, soaps, detergents, medicines, chemicals, and solvents, to name a few non-limiting examples.

Fluidly coupling and decoupling the volume of fluid to the preform can include the following aspects. In certain embodiments, fluidly coupling the volume of fluid to the preform includes opening a valve positioned between the preform and the volume of fluid. For example, the valve can separate a blow nozzle from the volume of fluid, where the preform is coupled to the blow nozzle. Fluidly decoupling the volume of fluid from the container can include closing the valve.

As at least a portion of the volume of fluid is directed into the preform by the pressure source, the following aspects can be present. Stretching the preform to form the container can include providing a hydraulic pressure within the preform of about 100 psi to about 600 psi. The pressure within the preform can be selected based upon several factors, including the size of the container and/or the speed at which the forming and filling operation is to be completed. It is understood that contact between the preform and the portion of the volume of fluid directed into the preform can in certain embodiments result in heat transfer from the preform to the fluid. Accordingly, the forming and filling of the container includes selection of parameters that balance the speed of the forming and filling with the cooling rate of the preform to maximize formation of the container prior to any heat loss presenting an issue with stretching of the preform and integrity of the resulting container.

It can be appreciated that the present technology can provide an improvement in forming and fill time for a given blow molding operation. In particular, there is no time contribution to the forming and filling as the pressure source accelerates from the initial state to the predefined process speed. Likewise, there is no time contribution to the forming and filling as the pressure source is decelerated from the predefined process speed toward the initial state. Fluidly coupling in a window defined by the attainment of the predefined process speed and prior to deceleration minimizes contact time between the preform and the portion of the fluid directed into the preform, thereby minimizing any heat loss from the preform to the fluid. In particular, certain embodiments of the present technology can reduce the forming and fill time by almost 40%. Put another way, the present technology can include where a time required to fill and form the container can be less than a time required to form the container by a method including the steps of: accelerating the pressure source from the initial state to attain a predefined process speed while applying pressure to the volume of fluid, the volume of fluid fluidly coupled to the preform, the pressure source directing at least the portion of the volume of fluid into the preform and stretching the preform; and decelerating the pressure source from the predefined process speed toward the initial state, thereby completing a stretching of the preform and forming the container, the container including at least the portion of the volume of fluid.

Certain embodiments of the present technology include simultaneously forming and filling a container in the following way. A pressure source is accelerated from an initial state to attain a predefined process speed while pressure is applied to a volume of fluid, where the volume of fluid includes a liquid. The volume of fluid is fluidly coupled to a preform upon attaining the predefined process speed, where the preform is at or above a phase change/solidification temperature of a material from which the preform is formed. The preform is disposed in a mold and the pressure source directs at least a portion of the volume of fluid into the preform and stretches the preform to conform to the mold to form the container. The resulting container includes at least the portion of the volume of fluid. The volume of fluid is then fluidly decoupled from the container. The pressure source is then decelerated from the predefined process speed toward the initial state. It is possible to mechanically stretch the preform with a stretch rod prior to fluidly coupling the volume of fluid to a preform upon attaining the predefined process speed. The pressure source can be configured as a servo pressure system.

Referring now to FIGS. 1 through 7, an embodiment of a system effecting a method according to the present technology is depicted. A mold station 10 is provided that is adapted to utilize a liquid commodity L (e.g., an end product used to form and fill a container) where the liquid imparts the pressure required to expand a heated preform 12 to take on the shape of a mold and thereby simultaneously form and fill the resulting container C. The system and method are illustrated with various particular means to perform certain structural and functional aspects of the present technology. However, it is understood that other analogous means can be employed and that not all structural and functional aspects shown in FIGS. 1 through 7 need be present in various embodiments of the present technology. Likewise, the present technology can include other aspects, including other aspects described herein, not shown in FIGS. 1 through 7.

Figure 1:
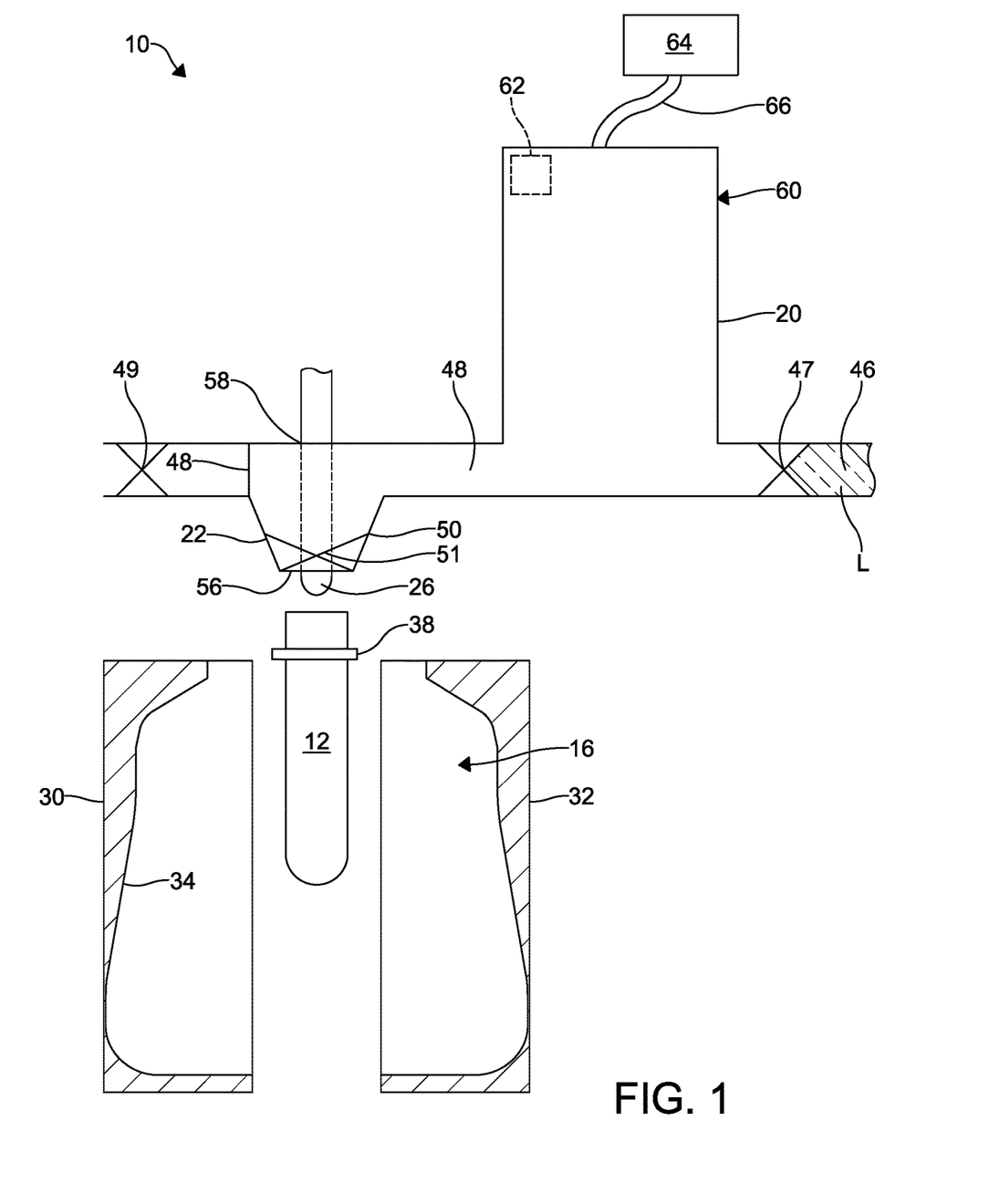
FIG. 1 is a schematic depiction of a heated preform passed into a mold station.

With initial reference to FIG. 1, the mold station 10 can include the following details. The mold station 10 generally includes a mold cavity 16, a pressure source 20, such as a high speed servo drive unit, a blow nozzle 22, and an optional stretch rod 26. The mold cavity 16 shown in FIGS. 1-7 includes two mold portions 30, 32 (e.g., mold halves) that cooperate to define an interior surface 34 corresponding to a desired outer profile of a blown container. The mold cavity 16 can be moveable between an open position (FIG. 1) and a closed position (FIG. 2) such that a support ring 38 of the preform 12 is coupled, supported, or immobilized at an upper end of the mold cavity 16.

In one example, the pressure source 20 can be in the form of, but not limited to, a servo drive unit or servo pressure system, a filling cylinder, a manifold, a chamber, a piston-like device (e.g., a piston-like device actuated by any suitable means such as pneumatic, mechanical, and/or hydraulic pressure), a pump (e.g., a hydraulic pump, or the like), or combinations thereof. It should be appreciated that in some embodiments, a movable filling cylinder, manifold, or chamber may not provide sufficient space optimization or facility efficiency. Moreover, in some embodiments, it may be difficult to obtain and/or route pressurized fluid from a first location to the preform shaping location.

As shown in FIGS. 1 through 7, the pressure source 20 is a servo system 60 that generally includes one or more servo motors 62 being actuated by one or more controllers 64 via a line 66. As will be discussed in greater detail herein, the servo system 60 can be positioned adjacent to the preform shaping location to achieve additional benefits. The servo system 60 includes an inlet 46 for accepting liquid commodity L and an outlet 48 for delivering the liquid commodity L to the blow nozzle 22. It is appreciated that the inlet 46 and the outlet 48 each include at least one valve 47, 49, respectively, that facilitate the flow of fluid (including liquid commodity L) through the mold station 10. The servo motor 62 may be operable in a first direction to draw the liquid commodity L from a fluid source (not shown) through the inlet 46 and output the liquid commodity L from the outlet 48 to the blow nozzle 22 (e.g., forward flow). The servo motor 62 may also be operable in a second direction to draw the liquid commodity L from the outlet 48, the blow nozzle 22, and/or the preform 12 (e.g., reverse flow), which will be discussed in greater detail herein. The inlet 46 of the pressure source 20 can be fluidly connected, such as by tubing or piping, to the fluid source (e.g., a reservoir or a container) that contains the liquid commodity L. It is appreciated that the pressure source 20 can be configured differently in various embodiments.

In some embodiments, the servo system 60 and any associated filling cylinder can be located generally adjacent to the blow nozzle 22. For reasons enumerated herein, by minimizing the flow distance, flow rates and pressures can be maximized. In some embodiments, as illustrated, corners or other restrictions can be minimized or eliminated, including corners, bends, and/or constricting fittings. In fact, in some embodiments, the servo system 60 and/or any associated fill cylinder may be mounted directly to the blow nozzle 22. However, this direct mounting configuration is not required as many of the benefits can be achieved by minimizing flow path length and mandrel bends, and maintaining the inside or inner diameters of the flow path as large as possible for the entire distance from the servo system 60 and any associated fill cylinder to the blow nozzle 22.

In addition to these mechanical modifications, the servo system 60 and any associated filling cylinder can be sized to output a volume of the liquid commodity L required to fully form and fill the container C, through a stroke of the servo, which can occur very rapidly (e.g., in less than about 0.2 seconds). It should be understood that servo system 60 can provide flow rates that are variable or selective, and/or operate at variable or selective pressures, within a predetermined amount of time.

In some embodiments, the forming and filling operation can use a high speed servo drive unit matched to a filling cylinder. Ideally, this can be a matched system that can produce pressures of up to about 600 psi while accelerating fast enough to fill a 2 liter container in less than 0.4 seconds with a more desirable fill time of about 0.2 seconds. The servo system 60 can be selected to have a desired force capability, can be coupled to an appropriate pitch ball screw, and can be attached to a selected and appropriately sized fill piston cylinder. By way of non-limiting example, the following configuration has been shown to be acceptable in certain embodiments: a 400 volt, 6 kW servo motor coupled to a 12 mm pitch ball drive screw and a 6 inch cylinder. Alternatively, the following configuration can be used in some embodiments: a 7.5 kW servo coupled to a 14 mm ball drive and a 5.5 inch cylinder. Consequently, it has been found that the present technology can be used to form and fill a 16 oz container and a 64 oz container in approximately the same relative time, that is, in about 0.03 to about 0.4 seconds, depending upon the neck finish size and the final container geometry.

In some embodiments, the servo motor 62 can be used to overcome some of the difficulties in metering precise and/or minute quantities of the liquid commodity L. That is, the servo motor 62 can be precisely and variably controlled to permit precise metering of a through-flow of the commodity L and at a variable rate. This precise and variable control can be coupled with a feedback loop to provide active and real-time monitoring and control of the fill process, including stopping of the filling process in the event of a detected issue, such as a blow-out of the resulting container. In this way, the feedback loop can be formed as part of the controller 64, with appropriate sensors disposed at any one of a number of locations to provide sufficient data to detect a relevant parameter (e.g., pressure sensors, flow sensors, shape sensors, and the like). Because active control of the pressures and quantity of flow of the liquid commodity L is often important to the final formed product, the use of the servo system 60 is particularly well suited to provide such benefits. It should also be appreciated that the servo system 60 may require less electrical power to operate relative to other systems configured as pressure sources, thereby providing additional benefits in terms of reduced electrical consumption and cost.

The blow nozzle 22 generally defines an inlet 50 for accepting the liquid commodity L from the outlet 48 of the pressure source 20 and provides an outlet 56 (see FIG. 1) for delivering the liquid commodity L into the preform 12. It is appreciated that the outlet 56 may define a shape complementary to the preform 12 near the support ring 38 such that the blow nozzle 22 may easily engage or mate with the preform 12 during the forming/filling process. In embodiments employing a sealing gasket disposed between blow nozzle 22 and preform 12, it should be noted that the sealing gasket can have minimal overlap into the fluid path so it does not hinder the flow of the liquid commodity L into the preform 12.

In some embodiments, the blow nozzle 22 and/or the pressure source 20 may define an opening 58 for slidably accepting the optional stretch rod 26 used to initiate mechanical stretching of the preform 12. However, it should be appreciated that the stretch rod 26 is not required in all embodiments. In embodiments employing the stretch rod 26, a Stretch Rod Withdrawal System (SRWS) may be used that induces stretch into the preform by just beginning to mechanically stretch the preform 12. Once the stretch is initiated mechanically, the fluid flow of liquid commodity L can begin to fill and form the preform 12. At this time, the stretch rod 26 can be simultaneously retracted when the fill sequence is activated thus increasing the available area for fluid flow into the preform 12. In some embodiments, the stretch rod 26 can be used to first enter the preform to displace air within the preform to facilitate subsequent introduction of the commodity L. To this end, the stretch rod 26 can be simultaneously retracted during introduction of fluid flow to provide an enhanced vacuum pull on fluid introduction. In addition to increasing the fluid path to maximum allowable, this system can also be employed to enter back into the container post fill to accurately set the fill level through a process of volume displacement. Additionally, vents may be formed in the stretch rod 26 to facilitate the venting of air contained within a preform prior to filling.

As described herein, it has been found that by increasing the fill velocity to a rate that permits the container to be formed and filled in less than about 0.4 seconds provides enhanced container quality and improved manufacturing efficiencies. Moreover, in some embodiments, it has been found that combined forming and filling durations of about 0.3 seconds to about 0.2 seconds provide even more improved container quality and manufacturing efficiencies. Structurally, it has been found that this rapid forming and filling process of the present teachings results in improved container structures on a crystalline level. Ideally, it has been found that all container sizes appear to benefit from a forming and filling process being within the range of about 0.03 seconds to about 0.15 seconds. The rapid forming and filling can minimize heat loss from the preform 12 to the liquid commodity L in certain embodiments.

In the method of forming and filling the container C described hereinbelow, the liquid commodity L may be continuously circulated within the pressure source 20 and/or filling chamber through the inlet 46. The temperature of the liquid L can be controlled and the liquid L can be heated or cooled, as desired. In addition, the resulting container C may be suitable for other high-temperature pasteurization or retort filling processes, or other thermal processes as well. In another example, the liquid commodity L can be introduced into the resulting container C under ambient or cold temperatures. Accordingly, by way of example, the resulting container C can be filled at ambient or cold temperatures such as between approximately 32° F. to 90° F. (approximately 0° C. to 32° C.), and more preferably at approximately 40° F. (approximately 4.4° C.).

With reference now to FIGS. 1 through 7, a method of simultaneously forming and filling the resulting container C is described. At the outset, the preform 12 may be placed into the mold cavity 16. In one example, a machine (not illustrated) places the preform 12 heated to a temperature above its phase change/solidification temperature (for PET, between about approximately 190° F. and about 250° F., approximately 88° C. to 121° C.) into the mold cavity 16.

Figure 2:
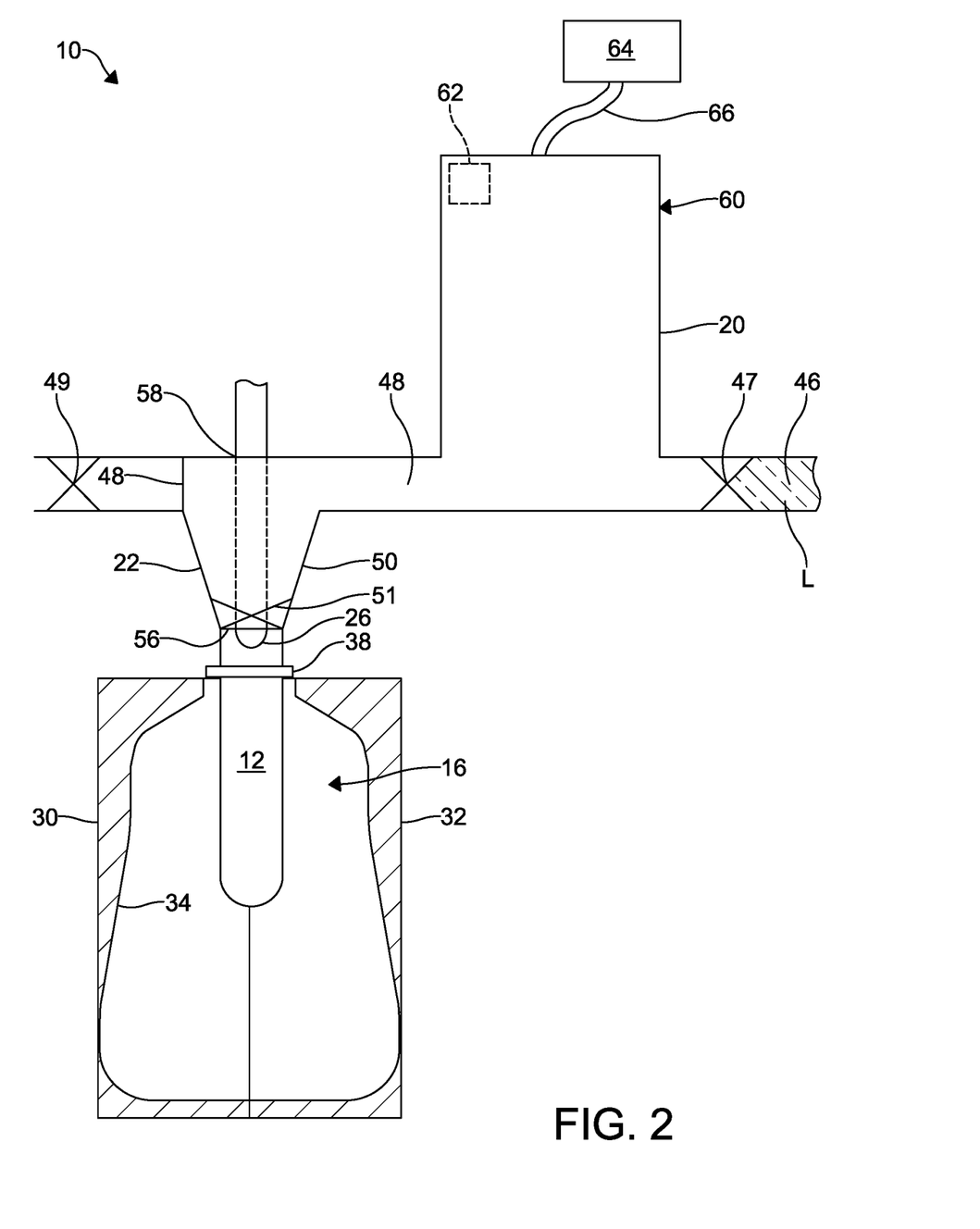
FIG. 2 is a schematic depiction of the system illustrated in FIG. 1 where two mold portions close around the preform.

The mold portions 30, 32 of the mold cavity 16 can then close thereby holding the preform 12 (FIG. 2). The blow nozzle 22 can form a seal at a finish of the preform 12. The mold cavity 16 may be heated to a temperature between approximately 250° F. to 350° F. (approximately 93° C. to 177° C.). In another example, the mold cavity 16 may be provided at ambient or cold temperatures between approximately 32° F. to 90° F. (approximately 0° C. to 32° C.).

As the preform 12 is located into the mold cavity 16, the pressure source 20 may begin to draw liquid commodity L into the filling cylinder, manifold, or chamber through the inlet 46. Liquid commodity L may continue to be drawn into the system by the pressure source 20 as the preform 12 is sealed against the blow nozzle and/or as the mold portions 30, 32 close.

Figure 3:
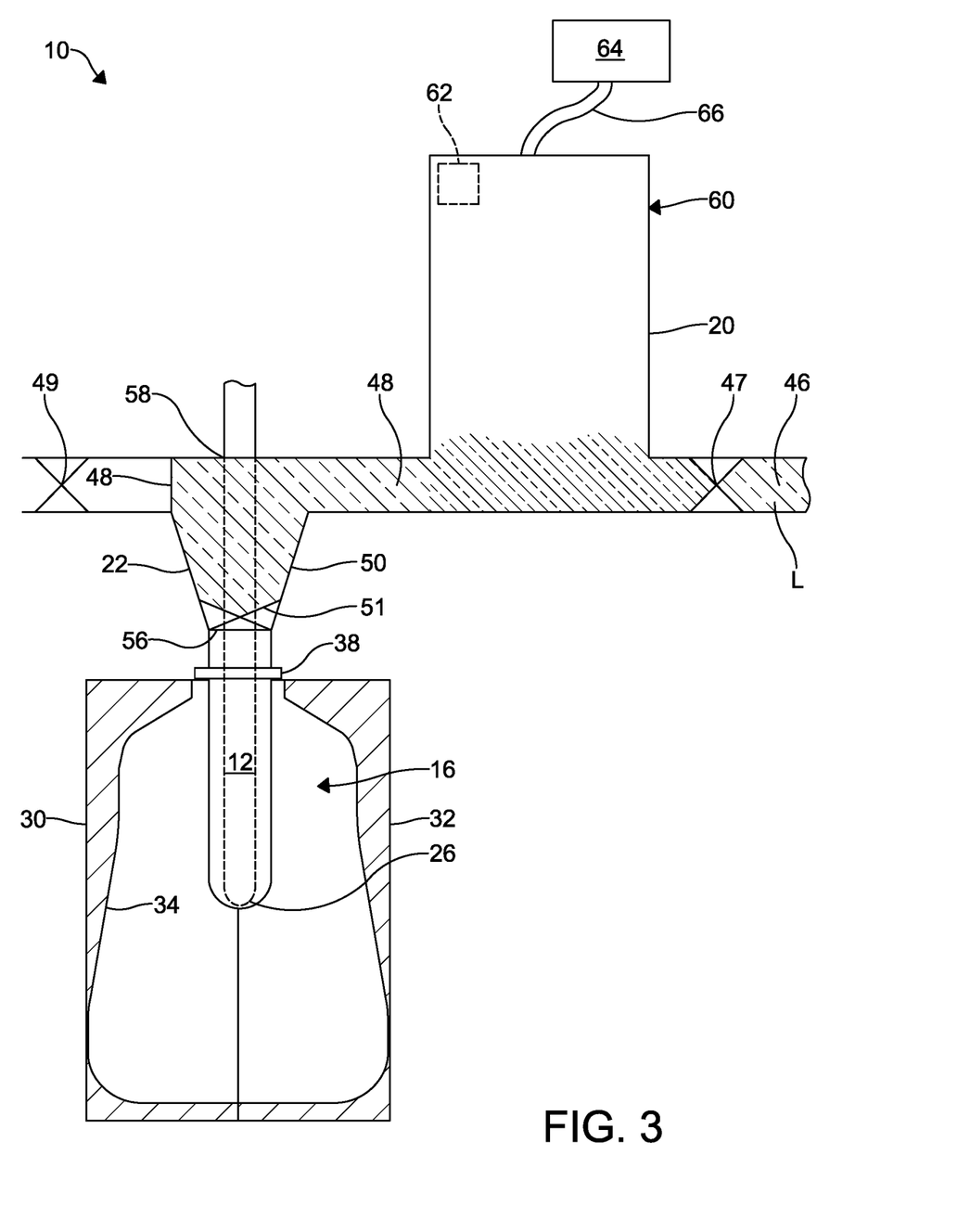
FIG. 3 is a schematic depiction of the system illustrated in FIG. 2 wherein a stretch rod extends into the preform.
Figure 4:
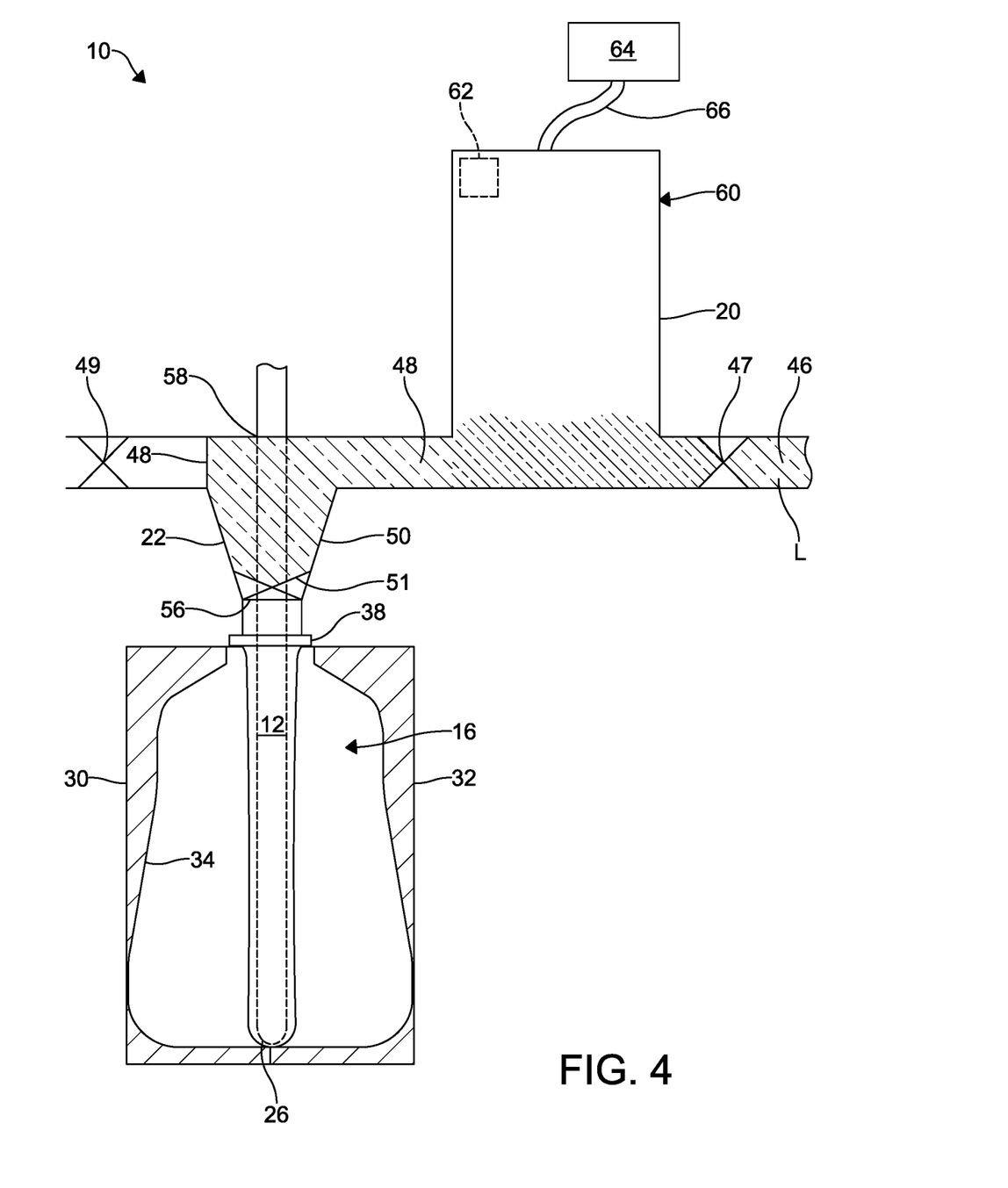
FIG. 4 is a schematic depiction of the system of FIG. 3 wherein the stretch rod mechanically stretches the preform.

Turning now to FIG. 3, the stretch rod 26 may extend into the preform 12 to initiate mechanical stretching thereof. With reference to FIG. 4, in some embodiments, the stretch rod 26 can continue to stretch the preform 12 thereby thinning the sidewalls of the preform 12. However, as indicated above, the stretch rod 26 can be immediately retracted after initial stretching while pressurized fluid flows into the preform 12. The volume of liquid commodity L in the filling cylinder, manifold, or chamber may increase until the appropriate volume suitable to form and fill the resulting container C is reached. It should be noted that this can be done at any point in time. Moreover, in some embodiments, the liquid commodity L can be imparted into the preform 12 during this stretching phase to prevent the preform from contacting the stretch rod and/or to fill the resultant space with liquid rather than air that is later displaced during filling.

The liquid commodity L flowing into the mold station 10 flows through a closed fill channel circuit that includes the fluid source (not shown) for providing the fluid commodity L through the inlet 46, to the outlet 48, and into the preform 12. Excess fluid L not used to form the preform 12 or that is removed during the blowing and filling process may be recirculated back to the fluid source.

Figure 8:
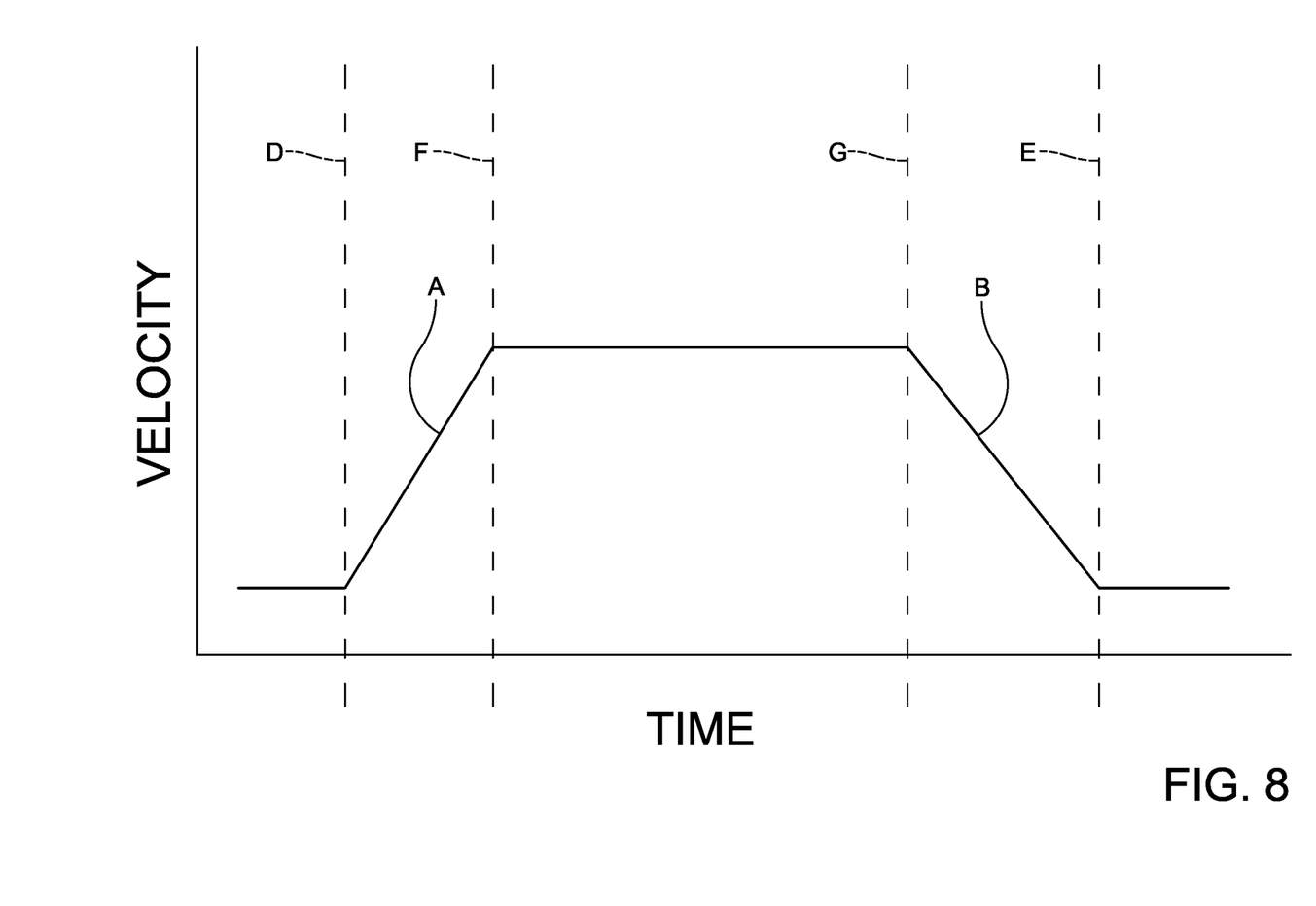
FIG. 8 is graph illustrating speed of a pressure source versus time, the pressure source directing at least a portion of a volume of liquid into a preform to form and fill a resulting container.

For certain blowing and filling processes, a fill channel circuit, defined by a portion of the mold station 10 between the valves 47, 49 and including the pressure source 20, is filled with a desired volume of liquid L from the fluid source. The fill channel circuit is then isolated by closing the valve 49 and the valve 47. Once the fill channel circuit is isolated, the pressure source 20 is allowed to accelerate to a predefined process speed, whereupon the pressure source is allowed to decelerate, after which time the fill channel circuit is reopened to facilitate fluid flow to the preform 12. Valve 51 is either open or not present in the mold station 10 during acceleration and deceleration of the pressure source. This process is represented in FIG. 8, which depicts a graph of velocity of the pressure source 20 versus time, wherein line A represents the acceleration of the pressure source, line B represents the deceleration of the pressure source, line D represents the closing of the valves 47, 49, and line E represents the opening of the valves 47, 49.

According to the present technology, however, the flow of the liquid commodity L in the station 10 can be modified to optimize the time required for the forming and filling process to result in a more rapid creation of the container C, thereby minimizing heat energy losses from the preform 12. Here, the pressure source 20 is allowed to accelerate to the predefined process speed (line A of FIG. 8) before the fill channel circuit is fluidly coupled to the preform by opening valve 51 (opening of valve 51 is represented by line F in FIG. 8). It should be noted that in place of valve 51, a pin valve or other valve within the blow nozzle 22 can be used to control the fluid coupling between the volume of liquid commodity L and the preform 12. For example, valve 51, a pin valve, and/or a valve located in the blow nozzle 22 can be opened at line F in FIG. 8, thereby fluidly coupling the volume of fluid (the liquid commodity L) to the preform 12 upon the pressure source 20 (the servo system 60) attaining the predefined process speed. This allows the pressure source 20 to direct at least a portion of the volume of fluid (the liquid commodity L) into the preform 12 and stretch the preform 12 to form the container C. The valve 51 (or pin valve, and/or valve located in the blow nozzle 22) is then closed prior to deceleration of the pressure source 20 (represented by line G in FIG. 8). This results in an improvement of the fill time by about 38% as compared to known processes described herein. For example, compare the forming and filling time between lines F and G versus the forming and filling time between lines D and E in FIG. 8. The improved sequencing related to the fill channel circuit improves fill time between sequence changes without introducing process instability and without increasing the power used by the pressure source 20. Accordingly, a fill time of the preform 12 can be reduced by up to about 40%, thus reducing the filling time to about 0.05-0.4 seconds or less depending upon the neck finish size and the container geometry.

Figure 5:
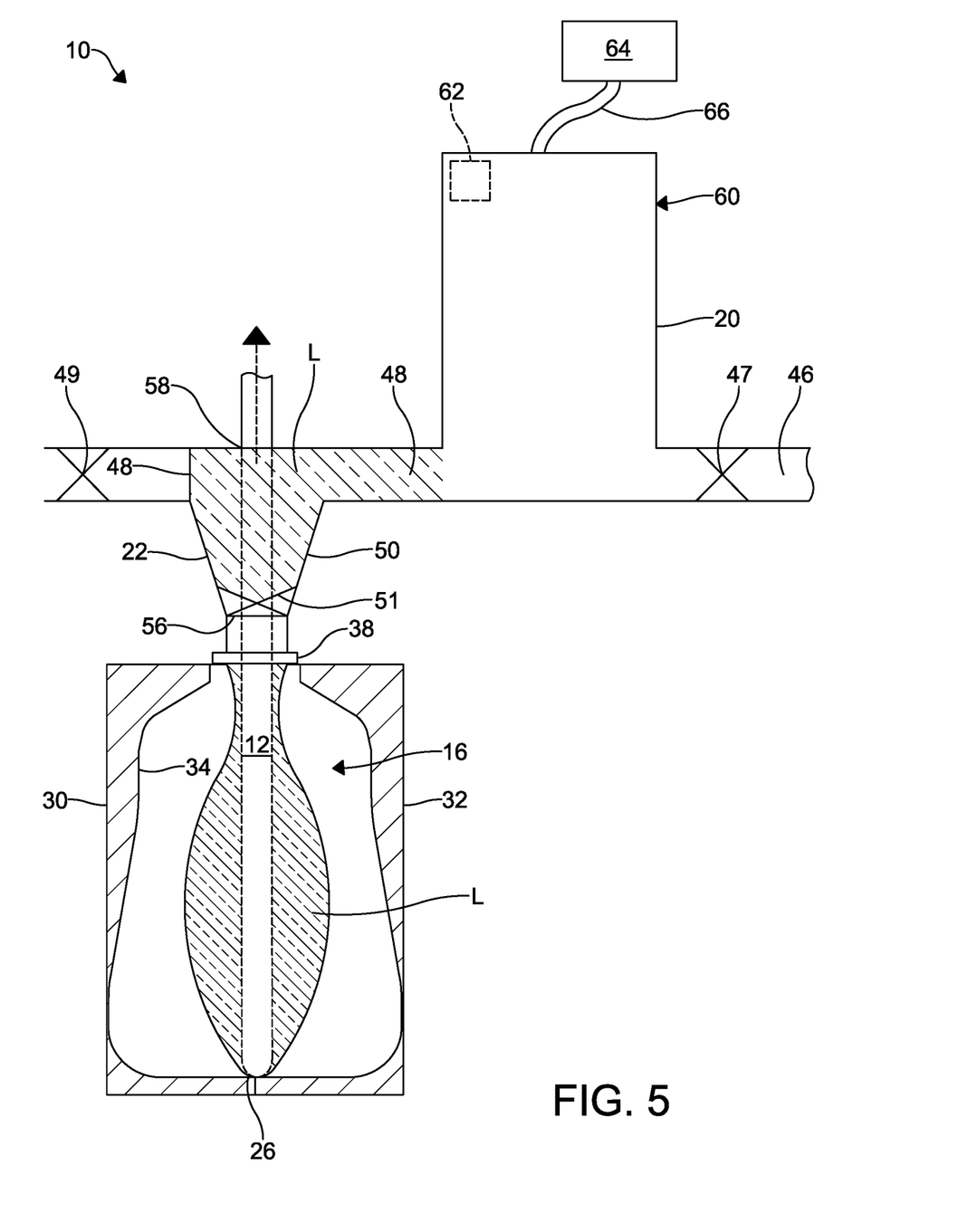
FIG. 5 is a schematic depiction of the system of FIG. 4 wherein a pressure source directs a volume of fluid including liquid into the preform thereby expanding the preform toward the walls of the mold cavity.
Figure 6:
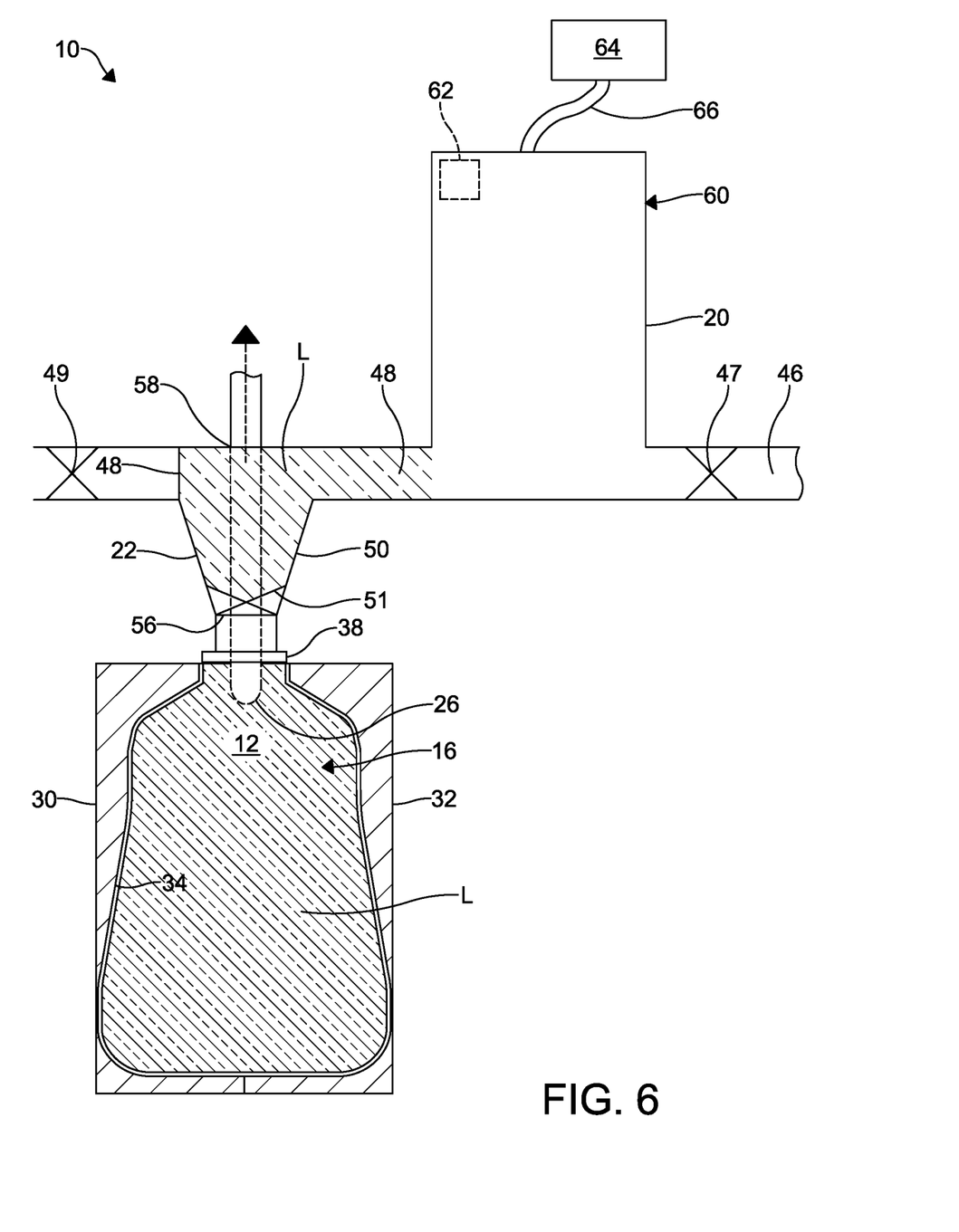
FIG. 6 is a schematic depiction of the system of FIG. 5 wherein the pressure source has directed an appropriate volume of liquid to the preform, the preform is expanded to conform to the mold and form a container holding the liquid, and the stretch rod is being withdrawn.

In certain embodiments, the fill channel circuit may be vented when the motion of the pressure source 20 ceases (e.g., when accelerated movement of the pressure source 20 is at a maximum). With reference to FIG. 5, the servo system 60 can be actuated to initiate the rapid transfer of liquid commodity L from the filling cylinder, manifold, or chamber to the preform 12. In one example, the hydraulic pressure within the preform 12 may reach between approximately 100 PSI to 600 PSI. The liquid commodity L causes the preform 12 to expand toward the interior surface 34 of the mold cavity 16. Residual air may be vented through a passage (not shown) defined in the stretch rod 26 (FIG. 5). As shown in FIG. 6, the servo system 60 has now completely transferred the appropriate volume of liquid commodity L to the newly formed resulting container C. Next, the stretch rod 26 may be withdrawn from the mold cavity 16, if it was not already withdrawn. The stretch rod 26 may be designed to displace a predetermined volume of liquid commodity L when it is withdrawn from the mold cavity 16 thereby allowing for the desired fill level of liquid commodity L within the resulting container C and/or the desired headspace.

Figure 7:
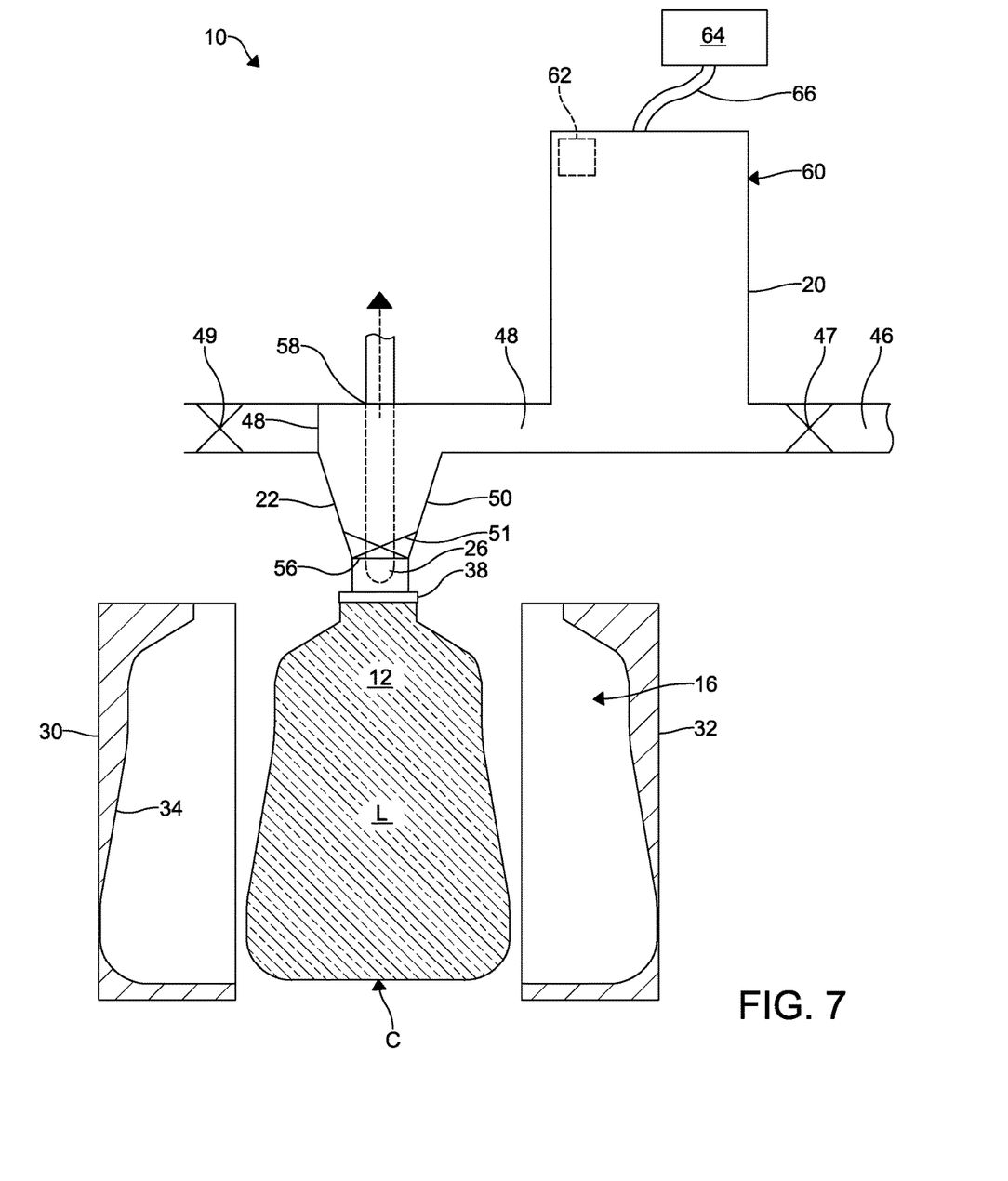
FIG. 7 is a schematic depiction of the system of FIG. 6 wherein the two mold portions are separated from the formed and filled container.

With reference to FIG. 7, the fill cycle is shown completed. The mold portions 30, 32 may separate and the blow nozzle 22 may be withdrawn. The resulting filled container C is now ready for post-forming steps such as capping, labeling, and packing. At this point, the servo system 60 may begin the next cycle by drawing liquid commodity L through the inlet 46 of the pressure source 20 in preparation for the next fill/form cycle. While not specifically shown, it is appreciated that the mold station 10 may include a controller 64 for communicating signals to the various components. In this way, components such as, but not limited to, the mold cavity 16, the blow nozzle 22, the stretch rod 26, the pressure source 20, and various valves, if employed, may operate according to a signal communicated by the controller. It is also contemplated that the controller may be utilized to adjust various parameters associated with these components according to a given application.

In the exemplary method described herein, preforms may be passed through an oven in excess of 212° F. (100° C.) and immediately filled and capped. In this way, the opportunity for an empty container to be exposed to the environment where it might become contaminated is greatly reduced. As a result, the cost and complexity of aseptic forming and filling may be greatly reduced.

In some instances where products are hot filled, the package must be designed to accommodate the elevated temperature that it is exposed to during filling and the resultant internal vacuum it is exposed to as a result of the product cooling. A design that accommodates such conditions may require added container weight. Liquid/hydraulic blow molding can reduce or eliminate the added material required for hot fill processes, and as a result, lower the package weight.

The method described herein can be particularly useful for filling applications such as isotonic, juice, tea, and other commodities that are susceptible to biological contamination. As such, these commodities are typically filled in a controlled, sterile environment. Commercially, various ways can be used to achieve the required sterile environment. One primary method for filling beverages is by using an aseptic filling environment. The filling operation is performed in a clean room. All of the components of the product including the packaging must be sterilized prior to filling. Once filled, the product may be sealed until it is consumed preventing any potential for the introduction of bacteria.

Various types of bottled products can produced using the present technology. Products such as dairy products, liquor, household cleaners, salad dressings, sauces, spreads, syrups, edible oils, personal care items, and others may be bottled utilizing such methods. Many of these products are currently in blow molded PET containers but are also in extrusion molded plastic containers, glass bottles, and/or cans. The present technology can improve the economics of package manufacture and filling for such products.

While much of the description has focused on the production of PET containers, it is contemplated that other polyolefin materials (e.g., polyethylene, polypropylene, etc.) as well as a number of other plastics may be processed using the systems and methods provided herein.

The present technology attains certain benefits and advantages. In particular, it has been discovered in the development of dual purpose forming and filling methods and systems that the best container quality is obtained by keeping forming and filling times to a minimum. It has also been found that by increasing the fill velocity to a rate that permits the container to be formed and filled in less than about 0.4 seconds provides enhanced container quality and improved manufacturing efficiencies. Moreover, in some embodiments, it has been found that combined forming and filling durations of about 0.3 seconds to about 0.2 seconds provide even more improved container quality and manufacturing efficiencies. Structurally, it has been found that this rapid forming and filling process of the present teachings results in improved container structures on a crystalline level. Ideally, it has been found that all container sizes appear to benefit from a forming and filling process being within the range of about 0.03 seconds to about 0.15 seconds. By reducing the forming and filling process time, an amount of time available for losses of heat energy from a heated preform used to form the container is also reduced. By minimizing heat energy losses from the heated preform, the preform may stay at a temperature at or above its phase change/solidification temperature, thereby improving an appearance and performance of a resulting container formed from the preform. The principles of the present teachings combine the benefits of high speed two-step blow molding, with consistent cycle times, with the efficiencies of simultaneous filling the container that results in a single-step, rapidly employed manufacturing system.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of simultaneously forming and filling a container comprising:
    isolating a fill channel circuit by closing each of a first valve disposed at an inlet of the fill channel circuit and a second valve disposed at an outlet end of the fill channel circuit, the fill channel circuit including a pressure source having a volume of fluid;
    accelerating the pressure source from an initial state to attain a predefined process speed while applying pressure to the volume of fluid, the accelerating of the pressure source occurring while the fill channel circuit is isolated;
    fluidly coupling the volume of fluid contained within the fill channel circuit to a preform upon attaining the predefined process speed, the pressure source directing at least a portion of the volume of fluid into the preform and stretching the preform to form the container, the container including at least the portion of the volume of fluid;
    fluidly decoupling the volume of fluid contained within the fill channel circuit from the container;
    decelerating the pressure source from the predefined process speed toward the initial state after fluidly decoupling the volume of fluid from the container.

2. The method of claim 1, wherein the pressure source has a velocity of about zero at the initial state.

3. The method of claim 1, wherein the pressure source directs at least the portion of the volume of fluid into the preform at a substantially constant process speed until the volume of fluid is fluidly decoupled from the container, wherein the substantially constant process speed is the predefined process speed.

4. The method of claim 1, wherein the pressure source directs at least the portion of the volume of fluid into the preform and stretches the preform to form the container in less than about 0.5 seconds.

5. The method of claim 1, wherein the pressure source directs at least the portion of the volume of fluid into the preform and stretches the preform to form the container in about 0.03 seconds to about 0.15 seconds.

6. The method of claim 1, wherein the pressure source directs at least the portion of the volume of fluid into the preform and stretches the preform to form the container in less than about 0.1 seconds.

7. The method of claim 1, wherein at least a portion of the preform is disposed in a mold and the pressure source directs at least the portion of the volume of fluid into the preform and stretches the preform to conform to the mold to form the container.

8. The method of claim 1, wherein the preform is at or above a phase change/solidification temperature of a material from which the preform is formed.

9. The method of claim 1, wherein the preform comprises polyethylene terephthalate.

10. The method of claim 1, wherein the preform is at a temperature between about 190° F. and about 250° F.

11. The method of claim 1, wherein the volume of fluid includes a liquid.

12. The method of claim 1, wherein the pressure source includes a member selected from the group consisting of: a servo pressure system; a piston-like device actuated by one of pneumatic, mechanical, and hydraulic pressure; and a hydraulic pump.

13. The method of claim 1, further comprising mechanically stretching the preform with a stretch rod.

14. The method of claim 1, wherein fluidly coupling the volume of fluid contained within the fill channel circuit to the preform includes opening a third valve separating a blow nozzle from the volume of fluid, the preform coupled to the blow nozzle.

15. The method of claim 14, wherein fluidly decoupling the volume of fluid contained within the fill channel circuit from the container includes closing the third valve.

16. The method of claim 1, wherein stretching the preform to form the container includes a hydraulic pressure within the preform of about 100 psi to about 600 psi.

17. The method of claim 1, wherein a time required to form the container is less than a time required to form the container by a method including the steps of:

accelerating the pressure source from the initial state to attain a predefined process speed while applying pressure to the volume of fluid, the volume of fluid fluidly coupled to the preform, the pressure source directing at least the portion of the volume of fluid into the preform and stretching the preform; and decelerating the pressure source from the predefined process speed toward the initial state, thereby completing a stretching of the preform and forming the container, the container including at least the portion of the volume of fluid.

18. A method of simultaneously forming and filling a container comprising:

isolating a fill channel circuit by closing each of a first valve disposed at an inlet of the fill channel circuit and a second valve disposed at an outlet end of the fill channel circuit, the fill channel circuit including a pressure source having a volume of fluid;

accelerating the pressure source from an initial state to attain a predefined process speed while applying pressure to the volume of fluid, the volume of fluid including a liquid, the accelerating of the pressure source occurring while the fill channel circuit is isolated;

fluidly coupling the volume of fluid contained within the fill channel circuit to a preform upon attaining the predefined process speed, the preform at or above a phase change/solidification temperature of a material from which the preform is formed, the preform disposed in a mold, and the pressure source directing at least a portion of the volume of fluid contained within the fill channel circuit into the preform and stretching the preform to conform to the mold to form the container, the container including at least the portion of the volume of fluid;

fluidly decoupling the volume of fluid contained within the fill channel circuit from the container;

decelerating the pressure source from the predefined process speed toward the initial state after fluidly decoupling the volume of fluid from the container.

19. The method of claim 18, further comprising mechanically stretching the preform with a stretch rod prior to fluidly coupling the volume of fluid to a preform upon attaining the predefined process speed.

20. The method of claim 18, wherein the pressure source includes a servo pressure system.

* * * * *